(12) United States Patent
Davis

(10) Patent No.: US 6,289,402 B1
(45) Date of Patent: Sep. 11, 2001

(54) BIDIRECTIONAL DATA TRANSFER PROTOCOL PRIMARILY CONTROLLED BY A PERIPHERAL DEVICE

(75) Inventor: Hedley Davis, Freemont, CA (US)

(73) Assignee: Amiga Development LLC, North Sioux City, SD (US)

( * ) Notice: Subject to any disclaimer, the term of this patent is extended or adjusted under 35 U.S.C. 154(b) by 0 days.

(21) Appl. No.: 08/097,372

(22) Filed: Jul. 23, 1993

(51) Int. Cl.⁷ .................................................. G06F 13/42
(52) U.S. Cl. ............................................. 710/31; 710/105
(58) Field of Search ........................ 364/935.3; 395/275, 395/200; 710/31, 105

(56) References Cited

U.S. PATENT DOCUMENTS

| | | | |
|---|---|---|---|
| 4,131,944 | * 12/1978 | Mager et al. | 710/107 |
| 4,246,637 | * 1/1981 | Brown et al. | 710/62 |
| 4,315,308 | * 2/1982 | Jackson | 710/33 |
| 4,439,826 | * 3/1984 | Lawrence et al. | 714/43 |
| 4,493,028 | * 1/1985 | Heath | 710/1 |
| 4,509,113 | * 4/1985 | Heath | 710/66 |
| 4,607,328 | * 8/1986 | Furukawa et al. | 711/112 |
| 4,851,990 | * 7/1989 | Johnson et al. | 710/100 |
| 4,872,107 | * 10/1989 | Marple et al. | 711/111 |
| 4,999,769 | * 3/1991 | Costes et al. | 710/25 |
| 5,131,081 | * 7/1992 | MacKenna et al. | 710/22 |
| 5,150,465 | * 9/1992 | Bush et al. | 710/14 |
| 5,163,132 | * 11/1992 | DuLac et al. | 710/53 |

* cited by examiner

Primary Examiner—Kenneth R. Coulter

(57) ABSTRACT

A method and apparatus are provided for bidirectionally transmitting a plurality of data values between a first processor and a second processor. Each data value represents a respective plurality of data bits. A direction indicating signal is formed and transmitted from the first processor to the second processor. The direction indicating signal enables the second processor to transfer data to the first processor when the direction indicating signal is in a first state. The direction indicating signal notifies the second processor that the first processor is ready to transfer data to the second processor when the direction indicating signal is in a second state. A clock signal is formed and transmitted from the first processor to the second processor. The clock signal is asynchronously changed from a first state to a second state when each respective one of the plurality of data values is transferred. The data values are transmitted between the processors in a direction indicated by the direction indicating signal. The clock signal is reset to the first state after each respective data signal is transferred.

11 Claims, 1 Drawing Sheet

BIDIRECTIONAL DATA TRANSFER PROTOCOL PRIMARILY CONTROLLED BY A PERIPHERAL DEVICE

FIELD OF THE INVENTION

This invention relates generally to the field of microprocessor powered computers (microcomputers) and specifically to the communications protocols for coupling peripheral devices to microcomputers.

BACKGROUND OF THE INVENTION

Microprocessors typically have simple system bus organizations. The input/output (I/O) circuits connected to the bus are important for determining the power and flexibility of the I/O method used. Peripheral devices typically connect to a microcomputer by a multi-conductor cable that electrically couples the device to the I/O circuits of the microcomputer which are, in turn, coupled to the system bus. The point of attachment for the cable to the microcomputer is called a port.

In a simple I/O system, several lines are connected to the system bus including at least one line each for data, address and control, respectively. Data are read from the data line(s) and are typically placed in a latch for readout during output operations. There may be many control lines for initiating I/O read, I/O write, ready and wait states, among others.

Direct I/O may be used if the input data is valid for a long time compared with the microprocessor instruction execution time. Such a system is simple and inexpensive to build. When the output of an address decoder and the read control line are active, (the address line typically has an active state when the address bus matches the interface port number), the value of a datum is placed on the bus. The address line has an inactive state otherwise. When the decoder output and the write control are active, data are placed in the output latch from the bus.

If the input data are valid for a short time relative to the microprocessor execution time, then a strobed I/O system may be used to identify the time periods during which the input and output signals are guaranteed to be valid. This involves the addition of circuitry for processing the strobe signal and for interrupt signal processing, so that data are read/written only when so indicated by the strobe signal.

One of the most common types of interfaces is the serial interface, which passes one bit of data at a time. A wide variety of peripheral devices are designed to plug into serial ports. Several interfaces for serial communications are used, and are identified by technical specifications including EIA RS-232, RS-422, RS-423 and RS-485. The RS-232 interface has been one of the most common interfaces. The RS-232 interface may use a 9 or 24 pin connector. If 9 pins are used, two transmit data, four provide handshaking signals and two enable inputs.

A number of parallel transmission protocols have become more widely used. Most printers employ a byte-wide unidirectional protocol with a 36 pin connector, commonly known as a "Centronics" interface. Of the 36 pins, 11 pins provide data transmission paths (8 pins), strobe, busy and an acknowledge pulse when the last character is finished. The printer sets the busy path low when it is ready to receive data and high when it is not ready. When the microcomputer has data to send and the busy signal is low, the microcomputer asserts data and then a strobe signal (with data guaranteed valid on both sides of the strobe). Some microcomputers allow bidirectional use of the Centronics interface. A control bit is sent to the port to reverse the direction of the 8 bit data path.

More recently, additional parallel interface standards have been developed for connecting disks and other high-performance peripherals to microcomputers. These include the Small Computer System Interface (SCSI) and the Intelligent Peripheral Interface (IPI). SCSI is an 8 bit parallel cable interface with both asynchronous and synchronous modes. The SCSI interface includes handshakes and protocols for multiple hosts and multiple peripherals, making it quite complex. In a typical configuration, a device includes a SCSI controller, which may be connected through a device level interface or directly to the device bus for "embedded SCSI" (i.e., the SCSI bus is the device level interface). The SCSI controller is coupled by a flat cable to the motherboard of the microcomputer, typically through a SCSI host adaptor. Although the SCSI controller only requires 16 pins to transfer user data between the device and the host, a typical SCSI controller, such as the "CXD1185AQ" controller marketed by the Sony corporation of America, may have 48 additional connections for handshaking and commanding the SCSI controller.

A simpler interface is desired for communications between high performance peripherals and microcomputers.

SUMMARY OF THE INVENTION

The invention is a method and apparatus for bidirectionally transmitting a plurality of data values between a first processor and a second processor. Each data value represents a respective plurality of data bits.

A direction indicating signal is formed and transmitted from the first processor to the second processor. The direction indicating signal enables the second processor to transfer data to the first processor when the direction indicating signal is in a first state. The direction indicating signal notifies the second processor that the first processor is ready to transfer data to the second processor when the direction indicating signal is in a second state.

A clock signal is formed and transmitted from the first processor to the second processor. The clock signal is asynchronously changed from a first state to a second state when each respective one of the plurality of data values is transferred. The data values are transmitted between the processors in a direction indicated by the direction indicating signal. The clock signal is reset to the first state after each respective data signal is transferred.

DETAILED DESCRIPTION

Overview

Figure 1:
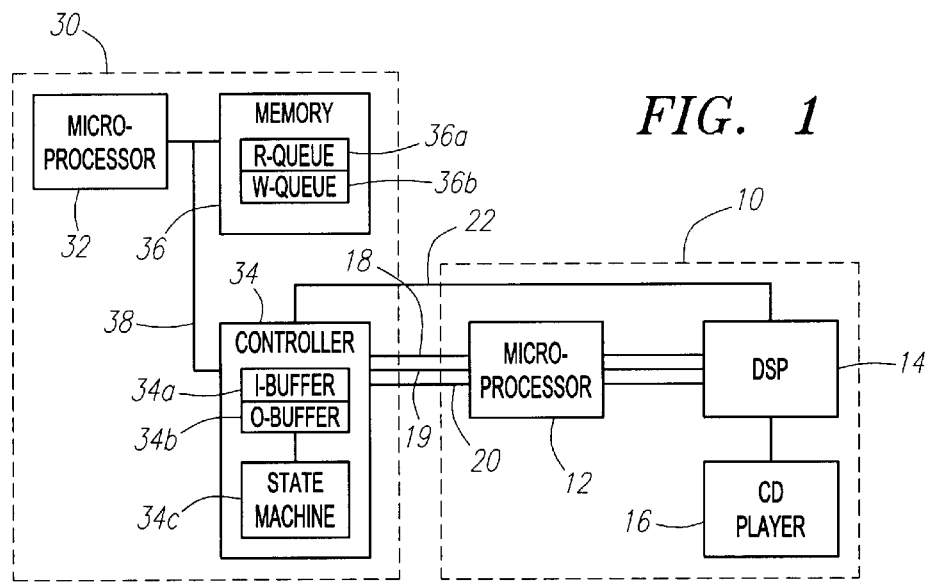
FIG. 1 is a block diagram of an exemplary system according to the invention.

The invention is a bidirectional communications system and protocol. FIG. 1 is a block diagram showing an exemplary system in accordance with the invention for coupling a compact disk read only memory (CD-ROM) assembly 10 to a microcomputer 30. The interface is controlled by software executed by the microprocessor 12 in the CD-ROM assembly 10.

A plurality of data values are transferred between the processor 12 in the CD-ROM assembly 10 and a second processor 32 in a microcomputer 30. Each data value represents a respective plurality of data bits. The interface may be configured with as few as three electrical paths 18–20 between the CD-ROM assembly 10 and the microcomputer 30. The interface provides data transfer in one direction at a time.

The direction control means for the interface is controlled by software within drive processor 12, which forms and transmits a direction signal 110 (shown in FIG. 2) from the first (drive) processor 12 to the host 30. The direction control means also include a communications path, such as direction line 18. The direction signal 110 enables the host 30 to transfer data to the drive processor 12 when the direction signal 110 is in a first state. The first state is "logic-high" in the exemplary embodiment. The direction signal 110 notifies the host processor 32 that the drive processor 12 is ready to transfer data to the host processor 32 when the direction signal 110 has a second state. The second state is "logic-low" in the exemplary embodiment.

The interface includes data transfer control means for forming and transmitting a clock signal 130 (shown in FIG. 2) from the drive processor 12 to the host processor 32. The data transfer control means include software in drive processor 12 and a communications path, such as clock line 19. For each data value, the drive processor 12 asynchronously changes the clock signal 130 from a first state (logic-high) to a second state (logic-low) when each bit is transferred. The drive processor resets the clock signal 130 to the first state (logic-high) after each bit of the data value is transferred.

The interface also includes data transfer means responsive to the direction signal 110 and the clock signal 120. The data transfer means include a data communications path, such as line 20, for transmitting the data values between the processors 12 and 32. The direction of data transfer is as indicated by the direction signal 110.

Description of the Exemplary Embodiment

The CD-ROM assembly 10 (referred to as "drive" 10) includes the CD player 16, a digital signal processor (DSP) 14 and a microprocessor 12 for handling command and status communications between the CD-ROM assembly 10 and the microcomputer 30.

The drive 10 may be a conventional unit, and may include several circuits and assemblies which are not shown in the drawings including a photodetector pick-up system, a playback signal amplifier, a focus servo control system to maintain an optimal focal distance between the pick-up and the disk, and a track servo system to keep the laser on track.

DSP 14 may be a conventional integrated circuit (IC) and may include such functions as a data separator, error correction, an oversampling digital filter and a constant linear velocity spindle motor control servo circuit.

The microcomputer 30 (referred to herein as the "host") may include a conventional Motorola 68020 microprocessor 32.

The drive 10 exchanges data with the microcomputer 30 via two interfaces. A user data channel 22 is used to transmit user data from drive 10 to microcomputer 30. Typically, direct memory access (DMA) is used to transfer large quantities of user data from the CD player 16 of drive 10 to the memory 36 of microcomputer 30 via the system bus 38, without the constant control of the microprocessor 32 of microcomputer 30. A DMA channel 22 is coupled to the communications controller 34 for this purpose.

The command channel interface 18–20 is used for transmitting other types of data between the CD-ROM assembly 10 and the microcomputer 30.

In the exemplary embodiment, the host side of the interface is implemented in hardware in the controller 34. The hardware may include I/O buffers 34a and 34b and a state machine 34c. A circular read queue 36a and a circular write queue 36b are provided in the memory 36 of the host 30. The state machine 34c maintains read and write pointers to the first and last valid locations respectively in the read queue 36a and the write queue 36b. Commands are retrieved from the write queue 36b by the state machine 34c and are stored directly into the buffer 34b to be serialized and provided to the drive 10. The input buffer 34a converts the serial bit stream received from drive 10 into a parallel stream that is provided to the host 30 via the read queue 36a.

The host sends commands to the drive 10 via the command channel 18–20. A variety of commands may be sent, such as commands to send specific data sectors, to stop, to pause, to play, to set play parameters, to send subcode data, to send an ID packet, to resend packets, to abort previously sent commands, etc. The host may also send null packets that are used for synchronization.

The host 30 and drive 10 communicate by sending bytes of information back and forth in packets. Packet length may be variable, in which case the first byte of a packet identifies the packet length for the recipient. In the exemplary embodiment, the last byte in each packet is a checksum byte, such that the sum of all bytes in the packet, including the checksum is $FF (The '$' character indicates a number in hexidecimal notation).

The drive 10 sends status packets, subcode packets, ID packets and null packets to the host 30. The status packets typically include a copy of the command byte (sent back to the host when a command is received), the drive status and a checksum byte. Status packets are also sent when the drive status changes. The status values include values representing conditions such as stopped, door opened, paused, playing, command execution in progress, and error conditions.

Subcode packets are sent from drive 10 to host 30 automatically with each block of data, and whenever the host 30 commands the drive 10 to send a subcode packet. The subcode packets include auxiliary and control information retrieved from the disk. The subcode data are not filtered by the DSP 14, and are sent to the host 30 unaltered.

ID packets are sent from drive 10 to host 30 when the host 30 requests an ID packet. The drive 10 returns an ID packet including manufacturer's name, part number and revision level.

The command channel 18–20 includes three lines. These are the direction line 18, the data line 19 and the clock line 20. The signals transmitted over these lines are described with reference to FIGS. 2 and 3.

Figure 2:
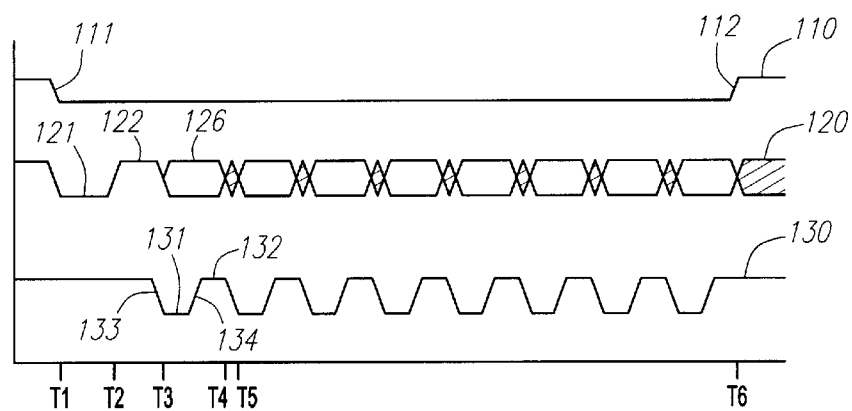
FIG. 2 is a timing diagram showing the transmission of data from the peripheral device shown in FIG. 1 to the host shown in FIG. 1.

FIG. 2 is a timing diagram showing the transmission of 1 byte of data from the drive 10 to the host 30 across the command channel 18–20 shown in FIG. 1. Each of the lines may have a logic-high state and a logic-low state. In the exemplary embodiment, the logic-high state is +5 Volts and the logic-low state is 0 Volts, in accordance with standard TTL levels. Signal 110 represents the state of the direction line 18. The state of the direction line 18 is controlled exclusively by the drive 10. Signal 130 represents the state of the clock line 20. The state of the clock line 20 is also controlled exclusively by the drive 10. Signal 120 represents the state of the data line 19. The state of the data line 19 may be controlled by either the drive 10 or the host 30.

The system has two operational modes: a polling mode and a transfer mode. In the polling mode, neither the drive processor 12 or the host processor 32 is transmitting data values. In the transfer mode, the data values are transferred between the drive processor 12 and host processor 32.

The Polling Mode

The system is normally in the polling mode. When the system is in the polling mode, the clock line 20 is in its first state (logic-high). In the polling mode, the direction line 18 is normally (but not always) in its first state (logic-high); this is the status of the direction line 18 which indicates data transfer from the host 30 to the drive 10. The data line 19 is normally in the first (logic-high) state when the system is in the polling mode.

Only the drive processor 12 can change the system state from the polling mode to the transfer mode. The drive 10 can control the respective states of the direction line 18, the data line 19 and the clock line 20. The drive processor includes means for changing the direction signal 110 asynchronously from the first state (logic-high) to the second state (logic-low), and subsequently changing the clock signal 130 from logic-high to logic-low (at 131) to change the system from the polling mode to the data transfer mode. This is shown by signal change 111 in signal 110 and signal change 133 in signal 130 in FIG. 2.

When the direction line 18 state is logic-low (i.e., the drive 10 has data to send), the host 30 can modify the state of the data line 19 to indicate whether the host 30 is ready to receive data. The host 30 sets the state of the data line 19 as follows. If the host cannot accept data, it sets the data line 19 to logic-low, as shown by signal value 121 between times T1 and T2 in FIG. 2. If the host can accept data, it sets the data line logic-high, as shown at signal value 122 between times T2 and T3 in FIG. 2. After setting the direction line 18 state logic-low, the drive 10 monitors the state of the data line 19 to determine when the host is ready to receive data. The drive 10 waits until the host sets the data line logic-high (at 122 at time T3) before transferring any data.

A different method is used when data are to be transferred from the host 30 to the drive 10. The host 30 does not control the state of the direction line 18 or the clock line 20. That is, the host 30 cannot control the direction or timing of data transfer; only the drive 10 can. Therefore, the host 30 uses the data line 19 to indicate to the drive 10 when the host 30 has data to send. The host can only use the data line 19 to indicate that the host 30 has data to send when the direction line 18 is in its logic-high state, i.e., when the direction of the interface is from host to drive (Otherwise, if the direction line 18 is low, modification of the data line 19 state by the host indicates readiness to receive data, as described above). When the direction signal 110 is logic-high and the host 30 sets the data signal 120 low, this acts as a request from the host 30 to the drive 10 to change the system state from the polling mode to the transfer mode.

Thus the host processor 32 and controller 34 include means for changing the state of the data transfer means (line 19) asynchronously when the direction signal 110 is in the first (logic-high) state, to request that the drive 10 change the state of the system from the polling mode to the data transfer mode. This is shown by the value of signal 120 in FIG. 3. In the polling mode, the data line 19 is normally in the logic-high state, as shown by signal value 221 in FIG. 3. When the host 30 has data (e.g., a command) to send to the drive 10, the host sets the state of the data line 19 to logic-low, as shown by signal value 222 between times T12 and T13 in FIG. 3.

The activity of the host while the system is in the polling mode may be summarized as follows: the host 30 modifies the state of the data line 19 to indicate to the drive 10 that the host is ready to receive data (when the direction signal 110 is logic-low), and to indicate that the host 30 has data to send to the drive 10 (when the direction signal 110 is logic-high).

When the drive 10 has determined that the host 30 is ready to receive data or transmit data the drive 10 changes the state of the system from the polling mode to the transfer mode by changing the state of the clock line 20 from the first state (logic-high) to the second state (logic-low), as shown in respective FIGS. 2 (at time T3) and 3 (at time T13).

The Transfer Mode

When the system is in the data transfer mode, the drive 10 controls the timing of the transfer of each individual bit, regardless of the transfer direction. While the system is in the transfer mode, the drive 10 maintains the state of the direction line 18 until a complete byte of data is transferred. Once the system is in the transfer mode, a change in the state of the direction line 18 is interpreted by the host 30 as a return of the system to the polling mode.

Figure 3:
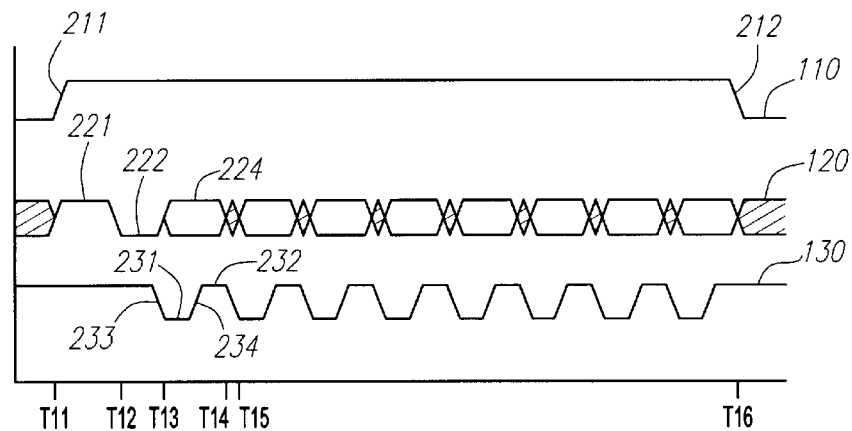
FIG. 3 is a timing diagram showing the transmission of data from the host shown in FIG. 1 to the peripheral device shown in FIG. 1.

In the transfer mode, the drive 10 controls the clock signal 130 asynchronously. Although FIGS. 2 and 3 show the clock signal 130 changing between logic-high and logic-low states at substantially constant intervals, the intervals need not be constant.

Referring first to FIG. 2, the transfer of a byte of data is shown between times T3 and T6. The transfer of the first bit begins when the drive 10 changes the clock signal 130 state from logic-high to logic-low, at time T3 (131). This state change also indicates to the host that first bit 126 is being transferred. The drive 10 sets the data line 19 to a value indicating zero or a value indicating one, at the falling edge 133 of the clock signal, as shown at 126. The drive 10 then resets the value of the clock signal 130 to the first state (logic-high) to clock the datum into the host, as shown at 132. The host 30 latches data bits on the rising edge 134 of the clock signal 130. This is repeated for the next seven bits, as shown. When the drive 10 has reset the clock signal 130 to the first state (logic-high) after the eighth bit, the drive 10 changes the state of the direction line 18 from logic-low to logic-high, as shown at 112. The host 30 detects the change in the direction signal 110 and transfers the entire byte, for example, into one of the buffers 34a. The change of state in signal 110 also changes the system state back to the polling mode at T6.

If the drive 10 has another byte of data to send to the host 30, the drive must again change the direction signal 110 to its logic-low state, as shown at 111. This returns the system to the transfer mode, and the entire sequence shown in FIG. 2 is repeated. Essentially, the drive 10 toggles the direction signal 110 (from logic-low to logic-high, and back to logic-low again), when the drive 10 resets the clock signal 130 after transferring the last bit of the first byte. Thus the drive 10 indicates to the host 30 that it has more data to send. The drive 10 waits until the host 30 again sets the data signal to its logic-high state, indicating that the host 30 is ready to receive the next byte.

Note that between the transfer of successive bytes from the drive 10 to the host 30, while the direction signal 110 is in its logic-high state, the host 30 can indicate to the drive 10 that the host 30 has data to send. The host does this by changing the state of the data signal 120 to logic-low. Should the host 30 have data to send, the drive 10 may allow the host to transfer data by changing the state of the clock signal 130, as explained below with reference to FIG. 3. Alternatively, the drive 10 can ignore the host's request and continue to transfer data to the host 30 by changing the direction signal 110 to its logic-low state again. The drive 10 controls the system's response to contention for the communications channel 18–20.

Referring now to FIG. 3, the transfer mode activities for host to drive communications are shown. A byte of data is transferred from the host 30 to the drive 10 between times T13 and T16. At 231, the drive changes the clock signal 130 state from logic-high to logic-low. The host 30 detects the change and places the first data bit 224 on the data line 19 at the falling edge 233 of the clock signal, by setting the data transfer line 19 to either the state representing a one or the state representing a zero. The drive 10 waits for at least a minimum time (e.g., 1 microsecond) for the host to set the state of the data line 19. Then the drive 10 accepts the bit 224 and resets the state of the clock signal 130 to the first state (logic-high) at 232. The host does not respond in any way to the resetting of the clock signal 130 at the rising edge 234. The drive 10 then repeats this procedure for each of the remaining seven bits. When the drive 10 has received the eighth bit, the drive changes the state of the direction signal at 212. This indicates to the host 30 that the byte has been transferred. The change in the direction signal 110 returns the system to the polling phase.

Because the direction signal is in its logic-low state at 112 (T6), the direction of transfer has now changed from host-to-drive to drive-to-host. This is so even if the host 30 has another byte to transfer to the drive 10. If the drive 10 has data to send to the host 30, the drive 10 can do so when the host 30 changes the data signal to its logic-high state, as shown at 122. The drive 10 indicates to the host that it is transferring data to the host 30 by changing the clock signal 130 to its logic-low state, as shown at 131. The host 30 then waits for the state of the direction signal to be returned to the logic-high state at the completion of the transfer of the byte from the drive 10 to the host 30. As noted above, the drive 10 may have several bytes to send to the host 30. The drive 10 determines whether to allow the host 30 to transfer a byte before the drive 10 has finished transferring data, or whether the host 30 must wait until the drive 10 is finished transferring all of the bytes.

It is understood by one skilled in the art that many variations of the embodiments described herein are contemplated. For example, different signal values may be used for the respective logic-high and logic-low states. Although the exemplary embodiment refers to the "first state" as being logic-high and the "second state" as logic-low, these values may be reversed. And although the exemplary embodiment used three lines to form a serial interface, additional lines (e.g., seven more data lines, not shown) could be added to form a parallel interface, using the same handshaking techniques described above. Furthermore, although the interface has been described in terms of communications between a host and a CD-ROM assembly, the interface may be used to allow a computer to communicate with other types of high performance devices.

While the invention has been described in terms of exemplary embodiments, it is contemplated that it may be practiced as outlined above with modifications within the spirit and scope of the appended claims.

What is claimed is:

1. A bidirectional communications system for transferring a plurality of data values between a first processor means and a second processor means, each data value representing a respective plurality of data bits, the system comprising:

direction control means for forming and transmitting a direction signal from the first processor means to the second processor means, to enable the second processor means to transfer data to the first processor means when the direction signal has a first state, and to notify the second processor means that the first processor means is ready to transfer data to the second processor means when the direction signal has a second state, said direction signal being exclusively driven by the first processor means;

data transfer control means for forming and transmitting a clock signal from the first processor means to the second processor means, the data transfer control means including means for asynchronously changing the clock signal from a first state to a second state when each bit of a respective one of the plurality of data values is transferred, and for resetting the clock signal to the first state after each individual bit of a data value is transferred, said clock signal being exclusively driven by the first processor means; and data transfer means responsive to the direction signal and the clock signal for transmitting the plurality of data values between the processors as indicated by the direction signal.

2. A communications system according to claim 1, wherein the direction control means, the data transfer control means and the data transfer means each includes a respectively different communications path to couple the first and second processors.

3. A communications system according to claim 2, wherein:

the data values are carried by the communications path of the data transfer means, and the first and second processors each include means for transmitting, via the data transfer means, the first state representing a value of one and the second state representing a value of zero.

4. A communications system according to claim 3, wherein:

the second processor includes means for changing the data transfer means asynchronously between the first state and the second state, to indicate to the first processor that the second processor is ready to transmit data to the first processor; and the data transfer control means is responsive to the second processor changing the state of the data transfer means to generate the data transfer control signal.

5. A communications system according to claim 1, wherein:

the system operates in a polling mode, in which neither of the first and second processors is transmitting data values, and a data transfer mode in which the plurality of data values are transferred between the first and second processors, the system normally being in the polling mode; and the first processor includes means for changing the clock signal asynchronously from the first state to the second state, to change the system from the polling mode to the data transfer mode.

6. A communications system according to claim 5, wherein the second processor includes means for changing the state of the data transfer means asynchronously when the direction signal is in the second state, to request that the first processor change the state of the system from the polling mode to the data transfer mode.

7. A communications system according to claim 1, further comprising a compact disk read only memory (CD-ROM)

drive coupled to the first processor, wherein the data signals are transferred between the CD-ROM drive and the second processor by way of the first processor.

8. A communications system according to claim 7, wherein a first subset of the data values are transmitted from the second processor to the CD-ROM drive, the first subset of the data values representing commands, and a second subset of the data values are transmitted from the CD-ROM drive to the second processor, the second subset of the data values representing status data and subcode information.

9. A communications system according to claim 8, further comprising a further communications path coupling the CD-ROM drive to the second processor, to provide direct memory access transfer of additional data to the second processor, the additional data being read from a disk by the CD-ROM drive.

10. A method for bidirectionally transmitting a plurality of data values between a first processor means and a second processor means, each data value representing a respective plurality of data bits, the method comprising the steps of:

forming and transmitting a direction indicating signal from the first processor means to the second processor means, to enable the second processor means to transfer data to the first processor means when the direction indicating signal is in a first state, and to notify the second processor means that the first processor means is ready to transfer data to the second processor means when the direction indicating signal is in a second state, said direction signal being exclusively driven by the first processor means;

forming and transmitting the plurality of data values between the processors in a direction indicated by the direction indicating signal; and forming and transmitting a clock signal from the first processor means to the second processor means, said clock signal being exclusively driven by the first processor means, including the steps of:

asynchronously changing the clock signal from a first state to a second state when each respective one of the plurality of data values is transferred, and resetting the clock signal to the first state after each individual bit of the data value is transferred.

11. A bidirectional communications system for transferring a plurality of data values between a first processor means and a second processor means, each data value representing a respective plurality of data bits, the system comprising;

direction control means for forming and transmitting a direction signal from the first processor means to the second processor means, to enable the second processor means to transfer data to the first processor means when the direction signal has a first state, and to notify the second processor means that the first processor means is ready to transfer data to the second processor means when the direction signal has a second state, said direction control means including a first single physical signal line and said direction signal being carried from said first processor means to said second processor means only by said first single physical signal line;

data transfer control means for forming and transmitting a clock signal from the first processor means to the second processor means, the data transfer control means including means for asynchronously changing the clock signal from a first state to a second state when each bit of a respective one of the plurality of data values is transferred, and for resetting the clock signal to the first state after each individual bit of a data value is transferred, said data transfer control means including a second single physical signal line and said clock signal being carried from said first processor means to said second processor means only by said second single physical signal line; and data transfer means responsive to the direction signal and the clock signal for transmitting the plurality of data values between the processors as indicated by the direction signal.

* * * * *